United States Patent Office 3,395,219
Patented July 30, 1968

3,395,219
PROCESS FOR PRODUCTION OF
PERTUSSIS ANTIGEN
Irving Millman, Willow Grove, Pa., assignor to Merck & Co., Inc., Rahway, N.J., a corporation of New Jersey
No Drawing. Filed Dec. 11, 1964, Ser. No. 417,828
3 Claims. (Cl. 424—92)

ABSTRACT OF THE DISCLOSURE

Cells of *Bordetella pertussis* are mechanically ruptured, the cell wall which contains the antigen is removed from the protoplasm and the antigen is extracted from the cell wall by the addition of an alkali metal salt of deoxycholic acid. The extracting liquid is recovered as the protective antigen is therein.

This invention is concerned with a novel method for extracting *B. pertussis* antigen and the use of this antigen in the preparation of monovalent or polyvalent vaccines that are devoid of any substantial quantity of *B. pertussis* cellular material.

Whooping cough is defined as an acute, highly communicable, infectious disease caused by *B. pertussis* which in children under 4 years of age is dangerous and probably ranks first as the cause of infant mortality. Immunization against this disorder has been accomplished in the past by injection of killed cell vaccine or extracted antigen. However, the frequent incidence of side reactions such as fever, irritability, inflammation and necrosis and the rare but disheartening report of encephalitis has constituted a potent stimulus for research leading to a better vaccine.

An object of the present inventon is to provide a *B. pertussis* antigen of substantially improved form which is capable of providing a lasting immunity to whooping cough and which does not produce the undesirable side effects of currently known vaccines.

Another object is to provide a vaccine which is free of cellular substances, some of which are toxic and may be responsible for the side reactions observed upon administration of commercially available vaccines.

In accordance with the above and other objects we have discovered that a useful vaccine for immunization against whooping cough can be prepared by a combination of procedures comprising mechanical disruption of *B. pertussis* cells and chemical extraction of the antigen from the cell wall. It has been established that the protective antigen is an integral part of the cell wall (sometimes referred to as cell membrane or cell envelope); the protoplasm of the cell, containing the major bulk of nitrogenous material, possesses little to no protective activity. The protoplasm does, however, contain a high concentration of toxic protein which can cause death in laboratory animals and undesirable side effects when present in vaccines that are administered clinically.

A feature of this invention, therefore, resides in disrupting the intact *B. pertussis* cell and isolating the cell walls by centrifugation or by other mechanical means. The isolated cell walls then are washed substantially free of cellular material, and extracted with a solution of a salt of deoxycholic acid (such as an alkali metal salt, preferably sodium and potassium salts, for example) which solubilizes the protective antigen and allows it to be separated mechanically from the cell wall.

The *B. pertussis* cells used in the process of this invention can be grown in any one of the known, suitable media, such as the charcoal agar medium described by Powell et al. [Public Health Reports 66:346 (1951)], the liquid media described by Verwey et al. (J. Bact. 58:127) or in Cohen-Wheeler culture medium [Amer. J. Pub. Health 36:371 (1946)]. After the growth period, the cells are harvested by centrifugation and can be used as harvested in the process of this invention or the cell paste can be frozen and stored at $-30°$ C. until needed. If desired, the harvested cells can be lyophilized and then stored until needed, or the cells may be killed with thimerosal or by other methods that are known not to destroy the protective antigen of *B. pertussis*.

The cells are resuspended in cold (2–5° C.) distilled water and subjected to explosive decompression in a Ribi Cell Fractionator (Ivan Sorvall, Inc., Norwalk, Conn.) at 30,000 p.s.i. and a temperature of 20° C. or less. While good results are obtained by employing 30,000 p.s.i. pressure it has been found that satisfactory results are obtained when pressures ranging between about 15,000–50,000 p.s.i. are used. Other means of disrupting cells and isolating the cell walls also can be used such as by sonic oscillation, mechanical mill, etc., but experience indicates that the Ribi Pressure Cell produces the highest yields of clean wall material. Before use, the Ribi Cell Fractionator is sterilized advantageously by exposing all of its tubing to ethylene oxide over a 24-hour period and then flushing with sterile nitrogen gas. The pressure unit is sterilized for one hour preferably by bringing all of its parts into contact with $\beta$-propiolactone (0.5%) and then flushing with sterile distilled water. A multiphase bacterial retaining filter or other suitable filter connects the decompression chamber with a nitrogen tank.

The *B. pertussis* cell suspension is fed into the compression chamber of the fractionator where they are subjected to a pressure of 15,000–50,000 p.s.i. which forces the cells into the decompression chamber where they explosively rupture. The decompression chamber is maintained at 20° C. or less by precooled nitrogen gas which is passed through the multiphase filter and into the chamber. The effluent from the decompression chamber containing the cell walls and protoplasm is collected in a sterile container immersed in an ice bath.

The effluent containing the disrupted cell material is centrifuged, the supernatant fluid discarded and the cell wall material remaining can be washed with cold distilled water to eliminate highly toxic, soluble protoplasmic constituents. Either washed or unwashed cell walls are suspended in a buffer to give a concentration between about 100 b./ml. to 2,000 b./ml., although for practical purchoses a concentration of 200 b./ml. generally is used. The protective antigen then is extracted by adding to the cell wall suspension a salt of deoxycholic acid to a final concentration of from about 0.1 to about 10%; however, for maximum extraction the final concentration preferably is between about 0.25 to about 1%. A pH range from about 8 to 10 has been found highly satisfactory for extraction, although lower or higher alkaline conditions can be used with variable yields of protective antigen.

The cell wall-deoxycholate mixture is gently agitated continuously for a period of from 18–48 hours while maintaining the temperature at between about 2–5° C. The material is centrifuged and the supernate dialyzed against buffer (0.01 M phosphate buffer) at a pH ranging from 7 to 7.7 in order to eliminate deoxycholate. The nondialyzable material containing the protective antigen is adjusted to pH 7.0 and diluted to a concentration that conforms to the standards prescribed by the National Institutes of Health. The solution of protective antigen can be preserved with an effective amount of preservative, such as thimerosal, benzethonium chloride, benzyl alcohol, gamma picolinium chloride or other known acceptable preservative and diluted to any desired strength.

The protective antigen obtained by the novel method of this invention can be used to prepare an aqueous vaccine or the antigen may initially be adsorbed to adjuvants such as aluminum hydroxide or phosphate or precipitated with alum and then made up as a vaccine. As the protective antigen is compatible with other antigens and/or toxoids, it can be combined with them in the conventional manner to provide a polyvalent vaccine in unitary dosage form.

The present invention has a number of distinct advantages. The product is free of all protoplasmic constituents one of which, the heat-labile toxin, is known to be extremely toxic for laboratory animals and may be responsible for some of the side reactions in humans. The product is free of nutrient medium, cell debris, and extraneous chemical substances. The product is compatible with other anitgenic materials currently combined with intact pertussis cell antigen. The process is simple and easily carried out and is reproducible giving high yields of active material.

The process is described in detail in the following example. It is to be understood that modifications can be made in the various techniques employed in carrying out the process of this invention; the important contribution being the extraction with deoxycholate of the protective antigen from *B. pertussis* cell walls that have been isolated from protoplasm as well as from other extraneous substances.

EXAMPLE 1

The cells from a 48-hour culture of *B. pertussis*, grown on Cohen-Wheeler medium, are harvested by adjusting the medium to pH 7.0 with concentrated hydrochloric acid, and centrifuging in a Sharples centrifuge. The cell paste obtained is resuspended in distilled water, passed through a 200-mesh nylon screen to remove gross particles and the filtrate is adjusted to a concentration of 500 b./ml. The cell concentration preferably should be within the range of 100–1000 b./ml. for the purposes of this invention.

The cell concentrate (1600 ml.) is fed into a pre-sterilized Ribi Cell Fractionator and subjected to a pressure of 30,000 p.s.i. The cells under pressure are extruded into the decompression chamber, maintained at 20° C. or less by cooled nitrogen gas, where the cells rupture explosively. The cellular material drains from the decompression chamber into a sterile vessel immersed in an ice bath, yielding 1600 ml. of effluent.

The effluent is centrifuged in a Spinco 18,000 batch bowl rotor head at 16,000 r.p.m. for 3 hours. Other centrifuge equipment can be used, such as the Sharples Centrifuge, for example. The supernate is decanted from the rotor head and the head may be refilled and spun one or more times, if desired, without removing the residue. The supernate that is removed and discarded contains the highly toxic protoplasmic fraction of the cell concentrate.

The residue or sediment remaining in the rotor head is removed preferably by adding steel heads to the rotor head and gently agitating the head by placing it on a rolling mechanism. Other known methods also can be used to dislodge the residue from the rotor head.

The residue is washed out of the rotor head with cold distilled water (2–5° C.) (approx. 800 ml.); the pH is adjusted to 8.5 by addition of 10% sodium hydroxide (approx. 1.0 ml.) and the final volume of cell wall suspension is adjusted to 1600 ml. with cold distilled water (2–5° C.). A sterile 2% solution of sodium deoxycholate is prepared at a pH of 8.5 (adjusted with 1 N sodium hydroxide prior to heat sterilization) and 1600 ml. of this solution is combined with the wall suspension. Cold sterile distilled water is added (800 ml.) to give 4000 ml. of wall suspension having a pertussis concentration equivalent to 200 b./ml. and a deoxycholate concentration of 1.0%. The concentrations of cell wall and extractant can as well be adjusted to a pertussis concentration equivalent to 100–2,000 b./ml. and deoxycholate between 0.1–10%. The suspension is gently agitated in a mechanical shaker at a temperature of 2–5° C. for 18–24 hours, and then centrifuged in a Spinco 18,000 batch rotor head (or other centrifuge) at 16,000 r.p.m. (30,100× gravity average) for an hour. The supernate is decanted and saved and the rotor head can be reused repeatedly to spin out additional quantities of cell wall suspension without removing the sediment.

The supernates containing protective antigen and sodium deoxycholate are pooled and dialyzed against 0.01 M phosphate buffer, pH 7.4–7.7, until no deoxycholate can be detected in the dialysate upon addition of concentrated hydrochloric acid. Usually the end point for deoxycholate detection occurs in the fourth change of buffer, each change representing about 135 liters of buffer held for a period of from 48–72 hours. The dexoycholate can be separated by other known means such as by passing the pooled supernates through Sephadex gel or by ultrafiltration although this may sacrifice some activity.

The nondialyzable extract, now having a volume of 4500 ml. when diluted to an equivalence of 32 b./ml., contains 14.7 protective units per ml. compared with the N.I.H. No. 6 control having 8 protective units per ml. and can be used to prepare aqueous, adjuvant or multivalent vaccines.

The potency of the cell extract and the N.I.H. control is determined by administering serial dilutions of the extract and the control to separate groups of mice and then challenging the animals intracranially with 0.03 ml. of a dilution of known virulent *B. pertussis* containing $10^5$ organisms/ml. The results obtained are recorded in Table I.

TABLE I

| | [1] 0.05 | [1] 0.01 | [1] 0.002 | [2] $ED_{50}$ | Confidence limits, Percent | P.U./ml.[3] |
|---|---|---|---|---|---|---|
| Ex. 1 Extract | [4] 29/32 | 8/32 | 1/32 | 0.0165 | 85-1:8 | 14.7 |
| N.I.H. No. 6 | [1] 0.06 / 25/31 | [1] 0.02 / 4/32 | [1] 0.0024 / 9/32 | 0.0304 | 85–118 | 8 |

[1] Dilution.
[2] Dose effective in protecting 50% of animals challenged.
[3] Protective units/ml.
[4] Animals surviving/animals tested.

The protective antigen (P.A.) extract of Example 1 was found to be nontoxic according to N.I.H. standards that require that, upon intraperitoneal injection of ½ of a single human dose into mice, there be no loss of weight in 3 days, a net gain of 3 grams in 7 days, and no more than 5% mortality in the animals used in the study. Upon I.P. injection of 0.25 ml. of the protective antigen extract from Example 1 into 10 mice, an average weight gain of 2.1 g. was observed at the end of 3 days, and an average gain of 6.5 g. was observed at the end of 7 days, with no deaths at the end of the test period.

The extract of Example 1 also passed the animal safety test in that no deaths and no symptoms occurred when ½ of a single human dose was injected into each of two 20 g. mice and 3 times a single human dose was injected into each of two 350 g. guinea pigs.

Conventional sterility tests established that the extract was free of mold and bacteria.

Electrophoretic and Ouchterlony analysis established the extract of Example 1 was devoid of the major portion of protoplasmic and wall antigenic substances other than protective antigen. The final vaccine contains one-third or less of the total nitrogen found in conventional vaccines.

Vaccine preparation

Aqueous vaccine.—The protective antigen extract concentrate from Example 1 is adjusted with buffered saline (pH 7.2) containing thimerosal 1:10,000 to a final concentration of 32 b./ml. or less. This vaccine remains stable when stored at 2–5° C.

Adjuvant vaccine.—To 4500 ml. of protective antigen concentrate from Example 1 is added 500 ml. sterile 10% potassium alum and the pH adjusted to 7.3 with cold (2–5° C.) 10% sodium hydroxide solution. The material is stored at 2–5° C. for 24 hours and then centrifuged at 2,000 r.p.m. for about 15 minutes in an International centrifuge maintained at 2–5° C. The supernate is discarded. The sediment is resuspended in buffered saline, pH 7.2, to give a final volume of 3,000 ml. at a concentration of 267 b./ml. equivalent. The vaccine concentration may be adjusted to 32 b./ml. equivalent or less by addition of sterile saline, pH 7.2, or 0.3 M glycine buffer. Thimerosal is added as a preservative in an amount sufficient to produce a concentration of 1:10,000 when diluted. This vaccine remains stable when stored at 2–5° C.

Multivalent vaccines.—Toxoids, such as diphtheria and tetanus toxoids, can be added to either of the above aqueous or adjuvant vaccines to give a multivalent vaccine wherein the toxoids are present in concentrations normally recommended.

The invention contemplates the extraction of protective antigen from B. pertussis cell walls by employing modifications of the procedures illustrated in Example 1 that have been described above. In particular, protective antigen can be extracted in concentrations useful for preparing vaccines by admixing under mildly alkaline conditions and at a temperature between about 2–5° C. a suspension of from about 100 to 2000 b./ml. of B. pertussis cell wall material and a sufficient quantity of a salt of deoxycholic acid to give a final concentration of between about 0.1 to 10% deoxycholate. The protective antigen thus obtained can be separated from deoxycholate by dialysis, by passing the protective antigen-deoxycholate mixture through Sephadex gel which removes the deoxycholate or by ultrafiltration. The concentrate of protective antigen thus obtained can be adjusted to any desired concentration and made up into a monovalent or polyvalent vaccine by any of the methods conventionally employed for preparing vaccines particularly those containing B. pertussis antigen. Additional examples to illustrate working within the above preferred ranges are not provided as it will be evident to those skilled in the biological sciences how to make the various modifications specifically taught herein.

Therefore, while the invention has been illustrated by certain specific procedures for disrupting B. pertussis cells, for extracting protective antigen from the cell wall materials and for preparing vaccines from the protective antigen thus prepared, the invention is to be understood to embrace the modifications falling within the scope of the disclosure and the appended claims.

What is claimed is:

1. A process of obtaining a pertussis antigen wherein *Bordetella pertussis* cells are mechanically ruptured, the cell wall is recovered by separating it from the protoplasm, the cell wall material containing the protective antigen is combined with water to give a suspension containing 100 to 2000 b./ml., then subjected to extraction by adding an alkali metal salt of deoxycholic acid to a concentration of 0.1 to 10% and also adding an alkali to adjust to pH 8–10, maintaining said mixture at a 2–5° C. temperature for a period up to about 48 hours, recovering the extracted liquid as it contains the protective antigen and removing the deoxycholate.

2. The process as claimed in claim 1 wherein following extraction the material is centrifuged, the supernate collected and dialyzed against phosphate buffer, pH 7.0–7.7, to remove substantially all deoxycholate.

3. The process as claimed in claim 1 wherein the concentration of B. pertussis cell wall material is about 200 b./ml.

References Cited

UNITED STATES PATENTS 2,965,543  2/1960  Thiele _____ 167—78

OTHER REFERENCES

Barta, Journal of Immunology, vol. 90, pp. 72–80, 1963.

RICHARD L. HUFF, *Primary Examiner.*